US006348908B1

(12) United States Patent
Richley et al.

(10) Patent No.: US 6,348,908 B1
(45) Date of Patent: Feb. 19, 2002

(54) AMBIENT ENERGY POWERED DISPLAY

(75) Inventors: Edward A. Richley, Palo Alto; Alexander E. Silverman, Menlo Park; Matthew E. Howard, San Francisco; Bryan T. Preas, Palo Alto, all of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/153,327

(22) Filed: Sep. 15, 1998

(51) Int. Cl.[7] .................................................. G09G 5/00
(52) U.S. Cl. ......................... 345/85; 345/207; 345/211; 250/215
(58) Field of Search ............................ 345/30, 31, 108, 345/111, 207; 250/215

(56) References Cited

U.S. PATENT DOCUMENTS

| 2,326,634 A | 8/1943 | Gebhard et al. |
| 2,354,018 A | 7/1944 | Heltzer et al. |
| 2,354,048 A | 7/1944 | Palmquist |

(List continued on next page.)

FOREIGN PATENT DOCUMENTS

| EP | 0 427 507 A3 | 5/1991 |
| EP | 0 427 507 A2 | 5/1991 |
| FR | 2161301 | 7/1973 |
| JP | 5357998 | 5/1978 |

OTHER PUBLICATIONS

N. K. Sheridon et al., "The Gyricon—A Twisting Ball Display," Proceedings of the SID, US, Society for Information Display, Playa Del Rey, CA, vol. 18, No. 3&4, Jan. 1, 1977, pp. 289–293.

(List continued on next page.)

Primary Examiner—Steven Saras
Assistant Examiner—William C. Spencer
(74) Attorney, Agent, or Firm—Oliff & Berridge, PLC

(57) ABSTRACT

A bistable display device that is powered only by ambient energy. Ambient energy is collected by an ambient energy receiver which converts the ambient energy into an operating signal and provides the operating signal to a controller. The controller drives the display device based on the operating signal. A user can create a custom display by fixing customizable patterned electrodes to the display. A display controller uses a self-starting oscillator. The oscillator outputs a clock input signal wave to a ripple counter and a voltage signal to a voltage doubler. The voltage doubler outputs a stored charge signal to a transformer concurrently with a clock pulse that is output by the ripple counter to change a state of the voltage output from the transformer to conductive electrodes within or on the display. The voltage output from the transformers applies an electric field across the display in the portions of the display covered by the conductors to switch the image on the display. As the display is bistable, if the ambient energy receiver and controller are detached from the display or there is an insufficient amount of ambient energy, the image on the display will stop switching, but will not fade.

24 Claims, 14 Drawing Sheets

U.S. PATENT DOCUMENTS

| | | | |
|---|---|---|---|
| 2,354,049 A | | 7/1944 | Palmquist |
| 2,407,680 A | | 9/1946 | Palmquist et al. |
| 3,475,213 A | * | 10/1969 | Stow .......................... 428/328 |
| 3,795,435 A | | 3/1974 | Schwab |
| 3,818,484 A | * | 6/1974 | Nakamura et al. .......... 368/204 |
| 3,915,771 A | | 10/1975 | Gatzke et al. |
| 3,919,625 A | * | 11/1975 | Barton ....................... 323/222 |
| 4,082,426 A | | 4/1978 | Brown |
| RE29,742 E | | 8/1978 | Tung |
| 4,117,192 A | | 9/1978 | Jorgensen |
| 4,126,854 A | * | 11/1978 | Sheridon ................... 345/107 |
| 4,143,103 A | | 3/1979 | Sheridon |
| 4,261,653 A | | 4/1981 | Goodrich |
| 4,268,413 A | | 5/1981 | Dabisch |
| 4,299,880 A | | 11/1981 | Arens |
| 4,367,920 A | | 1/1983 | Tung et al. |
| 4,374,889 A | | 2/1983 | Arens |
| 4,418,098 A | | 11/1983 | Maistrovich |
| 4,438,160 A | | 3/1984 | Ishikawa et al. |
| 4,438,926 A | * | 3/1984 | Yokoi et al. .................. 368/10 |
| 4,511,210 A | | 4/1985 | Tung et al. |
| 4,527,096 A | * | 7/1985 | Kindlmann .............. 315/169.3 |
| 4,569,857 A | | 2/1986 | Tung et al. |
| 4,678,695 A | | 7/1987 | Tung et al. |
| 4,688,900 A | | 8/1987 | Doane et al. |
| 4,695,528 A | | 9/1987 | Dabisch et al. |
| 4,721,649 A | | 1/1988 | Belisle et al. |
| 4,725,494 A | | 2/1988 | Belisle et al. |
| 4,729,687 A | | 3/1988 | Arens |
| 4,810,431 A | | 3/1989 | Leidner |
| 4,837,071 A | | 6/1989 | Tagoku et al. |
| 4,890,902 A | | 1/1990 | Doane et al. |
| 4,919,521 A | | 4/1990 | Tada et al. |
| 4,948,232 A | | 8/1990 | Lange |
| 4,994,204 A | | 2/1991 | Doane et al. |
| 5,039,557 A | | 8/1991 | White |
| 5,107,354 A | * | 4/1992 | Yamazaki et al. ............ 359/56 |
| 5,128,203 A | | 7/1992 | LaRoche |
| 5,155,607 A | | 10/1992 | Inoue et al. |
| 5,160,920 A | | 11/1992 | Harris |
| 5,219,820 A | | 6/1993 | Morohoshi et al. |
| 5,228,067 A | * | 7/1993 | Ito et al. ...................... 377/114 |
| 5,251,048 A | | 10/1993 | Doane et al. |
| 5,262,098 A | | 11/1993 | Crowley et al. |
| 5,262,374 A | | 11/1993 | Okabe et al. |
| 5,274,460 A | | 12/1993 | Yamada et al. |
| 5,331,454 A | | 7/1994 | Hornbeck |
| 5,344,594 A | | 9/1994 | Sheridon |
| 5,384,067 A | | 1/1995 | Doane et al. |
| 5,389,945 A | | 2/1995 | Sheridon |
| 5,469,020 A | | 11/1995 | Herrick |
| 5,604,027 A | | 2/1997 | Sheridon |
| 5,844,531 A | * | 12/1998 | Betsui ......................... 345/75 |
| 6,120,588 A | * | 9/2000 | Jacobson ................. 106/31.16 |

OTHER PUBLICATIONS

"Circuit Works Technical Data Sheet Conductive Pen," Chemtronics Inc., address date Feb. 1996, revised composition/warning pages Feb. 1998.*

Lawrence L. Lee, "A Magnetic Particles Display", *IEEE Transactions on Electron Devices,* vol. ED 22, No. 9, Sep. 1975, pp. 758–765.

N.K. Sheridon and M.A. Berkovitz, "The Gyricon—A Twisting Ball Display", *Proceedings of the S.I.D.,* vol. 18/3 & 4, 1977, pp. 289–293.

A. Chiang, D. Curry and M. Zarzycki, "A Stylus Writable Electrophoretic Display Device", *S.I.D. 79 Digest,* 1979, pp. 44–45.

M. Saitoh, T. Mori, R. Ishikawa and H. Tamura, "A Newly Developed Electrical Twisting Ball Display", *Proceeding of the S.I.D.,* vol. 23, No. 4, 1982, pp. 249–250.

G. Chur, "A Page from the Future", San Jose Mercury news, Jun. 18, 1996, pp. 12E, 11E.

Robert L. Saxe and Robert I. Thompson, "Suspended–Particle Devices", *Information Display,* No. 4&5, 1996, pp, 20–23.

IEEE GRID, Jan. 1996, pp. 17–20 (includes article entitled "Electric Paper: A Research Odyssey" and corresponding calendar listing at p. 19).

Philip Yam, "Plastics Get Wired", *Scientific American,* Jul. 1995, pp. 82–87.

OPE (Office Equipment and Products), "Thermal Film Medium from Ricoh Permits Rewriting", Dec. 1993, p. 610.

Peter Tebbutt, "Now you see it . . . now you don't", *New Scientist,* May 30, 1992, p. 17.

J. D. Mosley, "Flexible LCD is lighter and thinner than glass", *EDN,* Oct. 31, 1985, p. 93.

* cited by examiner

AMBIENT ENERGY POWERED DISPLAY

INCORPORATED BY REFERENCE

The following patents and patent applications are herein incorporated by reference: U.S. Pat. No. 4,126,854 to Sheridon; U.S. Pat. No. 4,143,103 to Sheridon; U.S. Pat. No. 5,604,027 to Sheridon; pending U.S. Pat. application Ser. No. 08/960,865 entitles "TWISTING CYLINDER DISPLAY" filed Oct. 30, 1997; and pending U.S. Pat. application Ser. No. 08/960,868 entitled "A TWISTING CYLINDER DISPLAY USING MULTIPLE CHROMATIC VALUES" filed Oct. 30, 1997; U.S. Pat. application Ser. No. 08/713,935, entitled "MONOLAYER GYRICON DISPLAY"; U.S. Pat. application Ser. No. 08/713,936, entitled "HIGH REFLECTANCE CYRICON DISPLAY"; U.S. Pat. application Ser. No. 08/716,675, entitled "GYRICON DISPLAY WITH INTERSTITIALLY PACKED PARTICLE ARRAYS"; and U.S. Pat. application Ser. No. 08/713,325, entitled "GYRICON DISPLAY WITH NO ELASTOMER SUBSTRATE".

BACKGROUND OF THE INVENTION

1. Field of the Invention

The invention relates to visual displays. More particularly, the invention relates to reusable, paper-like, gyricon or twisting-particle type or other bistable visual displays and apparatus for driving displays.

2. Description of Related Art

Paper is a preferred medium to present and display text and images. A reason for paper being a preferred medium is the many advantages that are realized with the use of paper as a display medium. For example, paper is thin, lightweight, portable, flexible, foldable, cost efficient, high contrast, reusable, basically permanent, and can easily be configured into a multitude of shapes. In addition, paper does not have any limitations on size, other than practicability, and as such, can be used as display media such as, for example, sticky notes or such, maps and billboards, to name a few. Furthermore, paper is capable of maintaining a displayed image without the need for a power source, such as, for example, batteries and other such stored energy sources. In addition, paper can be read in ambient light, as well as marked upon with any number of implements, such as, for example, a pen, pencil, paintbrush, printers, photocopiers, and the like.

However, although paper has many advantages as a display medium, paper is not well suited for real-time display purposes. Real-time imagery from computer, video, and other sources cannot be displayed by means other than, for example, a cathode-ray tube (CRT) display or a liquid-crystal display (LCD). Unfortunately, most real-time display media lack many of the desirable advantages of paper, such as, for example, being lightweight, thin, portable, physical flexibility, and the ability to retain a displayed image in a stable manner without a power source. As such, attempts have been made to combine the desirable qualities of paper with those of real-time display media in order to provide a display that offers the best of both worlds. One such display is electric paper.

Like paper, electric paper can be written on and erased, can be read in ambient light, and can retain information in the absence of an electric field or other external retaining force. Also, like ordinary paper, electric paper can be made in the form of a lightweight, flexible, durable sheet that can be folded or rolled into tubular form about any axis and conveniently placed into a shirt or coat pocket, and then later retrieved, restraightened and read substantially without loss of information. Yet, unlike paper, electric paper possible can be used to display imagery in motion. Thus, electric paper is adaptable for use in computer systems, television, signs and a host of other application within office, industrial and domestic settings.

A gyricon display, also called a twisting-element display, rotary element display, particle display, dipolar particle light valve, etc., offers an example of a technology for making a form of electric paper. Briefly, a gyricon display is an addressable display made up of a multiplicity of optically anisotropic particles, such as, for example, spheres, each of which can be selectively rotated to present a desired image to an observer. For example, a gyricon display can incorporate rotational elements each having two distinct halves, e.g., one half may be black, while the other half is white.

The rotational elements are embedded in a sheet of optically transparent material that contains a multiplicity of cavities and is permeated by a transparent dielectric fluid. The fluid-filed cavities accommodate the rotational elements, one element per cavity, so as to prevent the elements from migrating within the sheet. Each element has a distinct electrical characteristic so that the elements are electrically as well as optically anisotropic Thus, an element can be selectively rotated within in respective cavity by application of an electric field, so as to present either the black or the white half to an observer viewing the surface of the sheet, for example.

The electric field is applied to the sheet by an external power source that is coupled across electrodes within the sheet. The polarity of the applied electric field dictates which portion of the elements is viewable to an observer. For example, a positive electric field may cause the elements to rotate such that block portions of the elements are visible, whereas a negative electric field may cause the elements to rotate so that white portions of the elements are visible. Thus, an electric field that is applied with alternating polarities can result in a switching or flashing display. However, the known gyricon displays cannot switch without the external power supply coupled across the electrical conductors within the sheet.

SUMMARY OF THE INVENTION

The invention provides a display in which the display is powered by ambient energy. The invention includes a controller that provides a signal for driving the display, which may have a large surface area, using only ambient energy. The controller can apply the driving signal to the display using only ambient energy because the optically anisotropic particles require very little energy to rotate. In other words, the display is a stand alone display with no external power source, such as batteries, attached to the display to provide the power needed for the application of the electric field necessary to drive the display.

In another aspect of the invention, the display is switchable display that is both powered by and viewable in ambient energy, e.g., visible light. The switchable display oscillates or alternates the presentation of the display. For example, the display is switched from a black-on-white display to a white-on-black display.

In another aspect of the invention, the display is a bistable display that is powered by and viewable in ambient energy or light. The display is bistable because the image presented by the display is maintained when there is no power or their driving signal applied to the display.

In yet another aspect of the invention, a conductor pattern may be applied to the back of the display to form a user customizable display. The conductor pattern may be manually applied by the user, e.g., metallic foil letters or symbols can be adhered to the display, or may even be printed by a printer using a conductive liquid as desired by the user.

The invention also provides circuitry for driving a display based on ambient energy.

These and other aspects of the invention will be described in or be apparent from the following description of specific embodiments.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Typically, known gyricon displays are made up of various types of rotating particles of elements. For example, U.S. Pat. No. 4,126,854 to Sheridon, which is incorporated by reference hereinabove, at FIGS. 1–3 depicts an example of a twisting element panel display.

Figure 1:
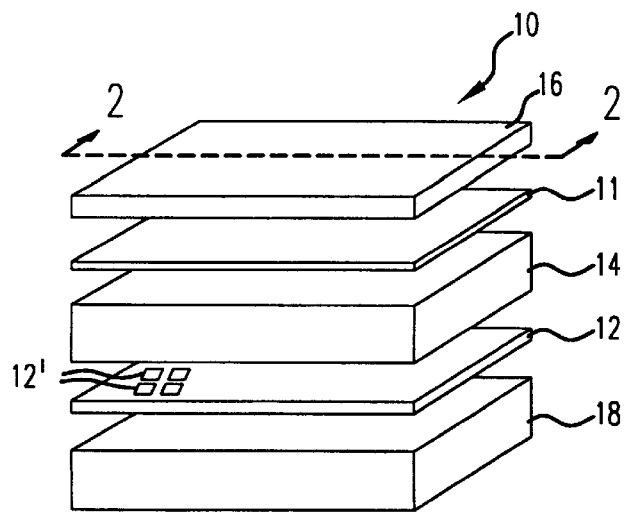
FIG. 1 is a perspective, exploded view of a conventional gyricon display.

Looking at FIG. 1, a display 10 has a display panel 14 sandwiched between substrates 16 and 18. Intermediate the display panel 14 and substrate 16 is a first grid 11. Although not shown in FIGS. 1 and 2, the first grid 11 may include a single continuous conductive layer, one or a plurality of patterned electrical conductors, or a matrix of selectively addressable electrical conductors. FIGS. 1 and 2 show a second grid 12 having electrical conductors 12' provided between the substrate 18 and the display panel 14. Like the first grid 11, the second grid 12 may also comprise a single continuous conductive layer, one or a plurality of patterned electrical conductors, or a matrix of selectively addressable electrical conductors.

Figure 2:
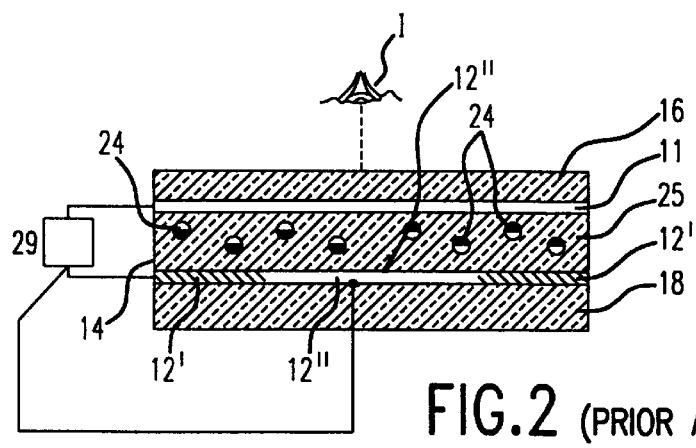
FIG. 2 is a sectional view of the conventional display of FIG. 1 taken on the line 2—2.
Figure 3:
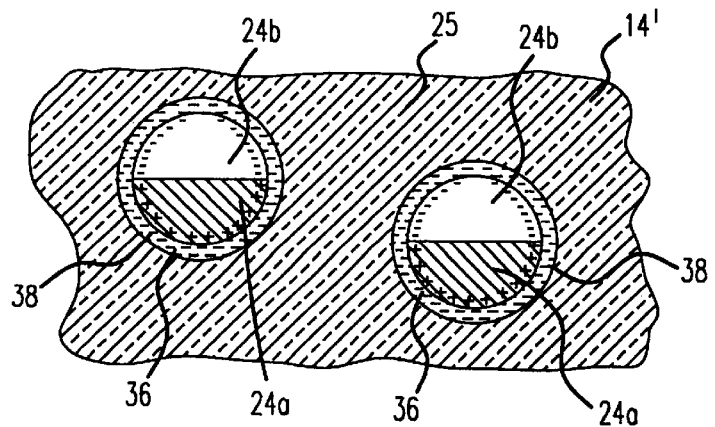
FIG. 3 as illustrates an enlargement of a portion of the conventional display of FIG. 1.

As shown in FIG. 2, at least one of the substrates 16 and 18 and at least one of the electrical conductors or conductive layer of the grid 11 or 12 adjacent the substrate 16 or 18 are optically transparent so that the display provided by the panel 14 can be viewed. In FIG. 2, the substrate 16 and grid 11 are made of optically transparent materials so that light incident upon the display panel 14 is reflected/absorbed to provide a visible image at I.

The display panel 14 includes a distribution of minute particle 24 which are optically anisotropic. The particles 24 are surrounded by an optically transparent dielectric fluid 38. The particles 24 also have a difference in Zeta potential, which causes the particles 24 to have an electrical anisotropy. In addition to the particles 24 and the dielectric fluid 38 which surrounds the particles 24, the panel 14 includes a solid, optically transparent support material 25, which permits the particles 24 to have the desired rotational freedom without having substantial transactional freedom. For example, in U.S. Pat. No. 4,143,103 to Sheridon, which discloses a method of making a display panel and is incorporated by reference hereinabove, the material 25 can be an elastomer or a rigid plastic, such as, for example, polyethylene, polystyrene or plexiglass. However, when the material 25 is a plastic, the particles 24 must be of a material which does not absorb plasticizer for reasons well known in the art.

As depicted in FIG. 3, which shows a small, enlarged portion 14' of the display panel 14, one half 24a of each of the particles 24 exhibits optical absorption characteristics, i.e., appears dark or black, and the other half 24b of each of the particles 24 exhibits light reflectance characteristics, i.e., appears light or white. The difference between the light reflectance-light absorption characteristics of halves 24a or 24b provide the desired optical anisotropy.

Each of the particles 24 is located within a cavity 36 of the transparent support material 25. The cavities 36 have a diameter slightly larger than the diameter of particles 24 so that the particles 24 have the previously discussed rotational freedom without transactional freedom. Filling the voids between the particles 24 and cavities 36 is the dielectric fluid 38. Due to the difference in Zeta potential between the halves 24a and 24b and the immersion of each of the particles 24 in the dielectric fluid 38, the particles 24 acquire an electrical charge, as shown symbolically in FIG. 3 where halves 24a are more positive than halves 24b.

Returning to FIG. 2, when an external power source 29 is coupled across the grid 11 and the grid 12 to apply an electric field across the material 23, the positively charged halves 24a of the particles 24 will be attracted to the more negative grid while the negatively charged halves 24b of the particles 24 will be attracted to the more positive grid. For example, an electric field can be applied by the power source 29 to the display though grid 11 and grid 12, both of which are a continuous conductive layer. If, for example, grid 11 is more positively charged than grid 12, then the particles 24 will all rotate such that the light reflective or negatively charged halves 24b face the grid 11 and light reflective image, e.g., white, will be observed by the viewer at I. Furthermore, if, for example, the polarity of the applied electric field is reversed and grid 11 is more negatively charged than grid 12, then the particles 24 will all rotate such that the light absorptive or positively charges halves 24a face the grid 11 and a solid light absorptive image, e.g., black, will be observed by the viewer at I.

As discussed above, one or both of the grids 11 and 12 may contain one or a plurality of patterned electrical conductors. FIG. 2 illustrates the grid 12 having first patterned electrical conductors 12' and second patterned electrical conductors 12". The first conductors 12' are connected to a shared first input source and the second conductors 12" are connected to a shared input source in a manner known in the art so that the pulsed electric fields can be applied to the respective conductors 12' and 12". In operation, for example, a first pulsed electric field is applied to the regions of the display 14 comprising the first conductors 12' while a second pulsed electric field is synchronized with the first pulsed electric field and applied simultaneously to the second conductors 12". If the grid 11 is more positively charged than the first conductors 12' then the light reflective or negatively charged halves 24b of the particles 24 in the regions of the display 14 near the first conductors 12' will rotate so that they are observed by the viewer at I. If, however, the grid 11 is more negatively charged than the second conductors 12", then the light absorptive halves 24a of the particles 24 in the regions of the display 14 near the second conductors 12" will rotate so that they are observed by the viewer at I. Hence, if the first conductors 12" form the background 601 of the image shown in FIG. 6 while the second conductors 12" form the text 600, then the background 601 will appear white while the text 600 will appear dark.

It should be understood that if the polarity of the applied electric fields are reversed, light text on a dark background (not shown) will result, for example, Also, it should be understood that first and second electric fields can be applied asynchronoulsy, such that the image can have the appearance of switching into or out of a background of the same shade, or synchronously such that the image and background switch simultaneously. In addition, it should be understood that either the background or the text can stay the same shade while the other changes shade. Such possibilities should be apparent to those in the art. It is also understood that grids 11 and 12 may contain a matrix of selectively addressable electrical conductors with which an image may be formed. An image containing text is only provided for explanation purposes. Any image can be displayed including text. Symbols, shapes, etc. provided the display has sufficient resolution and conductors in the grids 11 and 12 are properly formed and/or addressed.

Figure 4:
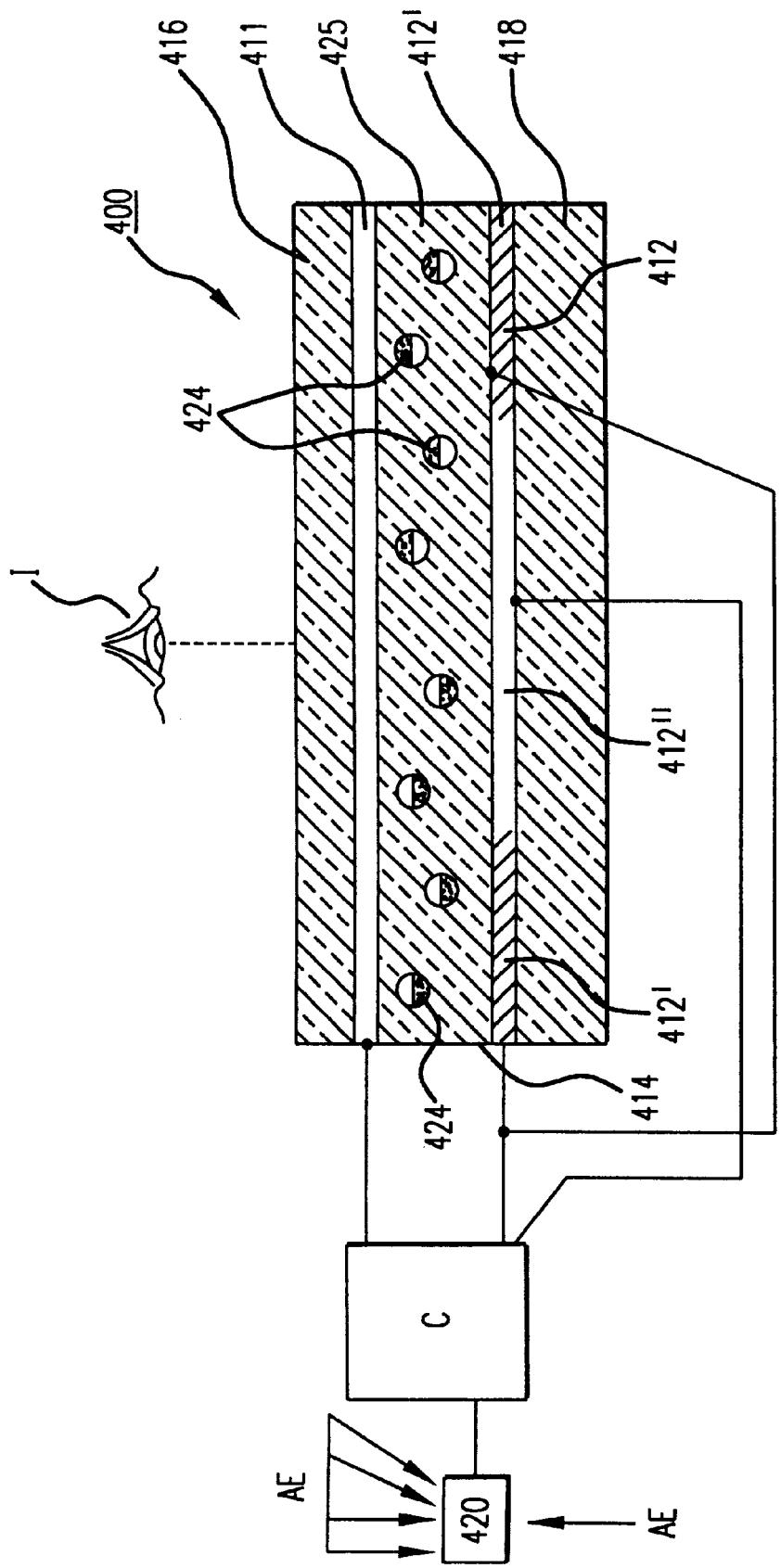
FIG. 4 is a perspective view of a first embodiment of a display in accordance with the invention.

FIG. 4 illustrates a sectional view of a display 400 in accordance with the invention. It can be seen that the display 400 is similar to the display 10 in FIGS. 1–2 except that the external power source 29 is replaced by a controller C and an ambient energy receiver 420. The controller C is powered by electrical power provided by the receiver 420 so that the controller C can apply driving signals to the display 400. It should be noted that the gyricon display 400 depicted in FIG. 4 is merely for explanatory purposes and that it should be apparent that any bistable display can be used. It should also be noted that the ambient energy receiver 420 and the controller C can be built into the display 400, for example, by placing the receiver 420 and controller C into a semi-rigid frame that can hold the receiver 420 and controller C together with the display 400. The receiver 420 and controller C are depicted as being attached on the side in FIG. 4 to simplify the explanation of the invention.

Ambient energy AE is the energy surrounding the display 400 in the environment in which the display 400 is located. For example, if the display 400 is located in an office, the ambient energy AE can be the energy that illuminates the office, such as, for example, sunlight, fluorescent light, incandescent lamps, candlepower, oil lamps and any other form of illumination that will provide light in the visible region. However, ambient energy AE is not limited to light in the visible portion of the spectrum.

Ambient energy AE can also be non-visible energy such as, for example, infrared light or the infrared portion of the spectrum. Additionally, ambient energy AE is not limited to light, either visible or non-visible, but can also include such forms of energy or energy sources as electromagnetic radiation, sound, electromagnetic fields, temperature, humidity, pressure, mechanical vibration or displacement, or any other measurable form of energy that can be collected an converted into electrical energy to provide the necessary driving signals for applying an electric filed to the display 400.

In other words, the display 400 is a stand alone display 400 that requires no external power source or electronics attached to the display 400 to provide the driving signals needed for application of the electric field necessary to show the image to be observed. In the disclosed embodiment, the display panel 414 is a gyricon display, but can be any one of many different kinds of displays, as discussed below.

The display panel 414 is sandwiched between the substrates 416 and 418. Intermediate the display panel 414 and substrate 416 is a first grid 411. As discussed above with regard to the display 10 in FIGS. 1–3, although the first grid 411 is illustrated as a continuous conductive layer, the grid 411 may also include patterned electrical conductors (not shown) and/or a matrix of selectively addressable electrical conductors (also not shown) if such displays are desired. Again, although FIG. 4 depicts a second grid 412 having first and second electrical conductors 412' and 412", respectively, the second grid 412 can also be comprised of a continuous conductive layer (not shown) and/or a matrix of selectively addressable electrical conductors (not shown). The second grid 412 is provided between the substrate 418 and the display panel 414.

At least one of the substrates 416 and 418 and the electrical conductors of the grid adjacent the substrate are optically transparent so that light is incident on the display panel 414 and so that the image provided by the display panel 414 can be viewed. Substrate 416 and grid 411 are made of optically transparent materials so that the light incident upon the display 400 will provide a visible image at I.

Also, the display panel 414 includes a distribution of minute particles 424 which are optically and electrically anisotropic. The panel 414 includes a solid, optically transparent support material 425 which permits the particles 424 to have the desired rotational freedom without having translational freedom.

The controller C uses the electrical energy from the ambient energy receiver 420 for applying the driving signals needed to show the image on the display panel 414. As will become evident from the following discussion, the controller C can function either with transformers or without transformers.

Figure 5:
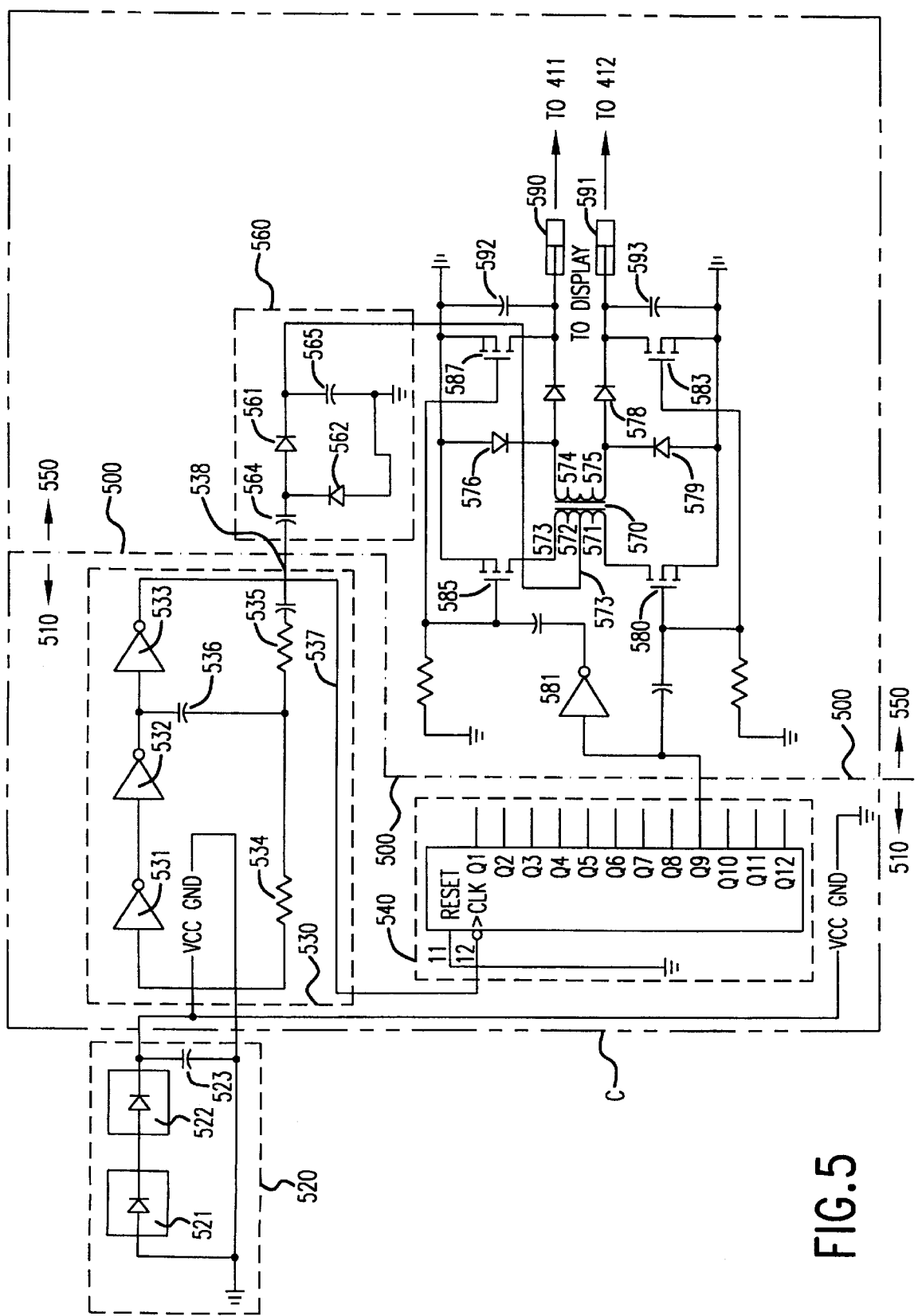
FIG. 5 illustrate a schematic of a first controller according to the invention having a transformer.

FIG. 5 illustrates a schematic of a first controller C according to the invention. The controller C includes a logic portion 510 connected to an ambient energy receiver 520, and a display driver portion 550. The logic portion 510 and display driver portion 550 are separated by reference line 500 for explanatory purposes and are not limited to the depicted structure. It should be noted that the logic portion 510 requires a low voltage to operate, while the display driver portion 550 requires a high voltage to operate. Additionally, the logic portion 510 includes a self-staring oscillator or clock 530 and a ripple counter 540. The display driver portion 550 includes a voltage doubles 560 and a transformer 570.

The ambient energy receiver 520 includes ambient energy collectors 521 and 522, which are solar cells connected in series, and a capacitor 523 to generate an open circuit voltage, such as, for example, approximately 2.5 Volts. Furthermore, in ambient room light, such as, for example, an office or other such artificially illuminated space, the arrangement of the ambient energy collectors 521 and 522 can supply a current of a few microamperes, depending on the intensity of the available ambient energy. The voltage and current are supplied to the oscillator 530 as electrical energy.

The oscillate 530 includes logical inverters 531–533 may be selected from any number of commercially available 4000-series complementary metallic oxide semiconductor (CMOS) integrated circuits or any other such suitable logic devices. The voltage and current supplied from the ambient energy receiver 520 is sufficient to operate the oscillator 530. The oscillator 530 outputs a substantially square wave signal on a line 537, which is used as a clock input to the ripple counter 540. In addition, the oscillator 530 outputs a signal on a line 538 to the voltage doubler 560, which includes diodes 561 and 562 and capacitors 564 and 565. Using the voltage produced by the ambient light receiver 520, the voltage doubler 560 produces a voltage of approximately 5 Volts in the capacitor 565.

The ripple counter 540 counter 540 has a plurality of outputs, which are represented by pins P1–P9 and P12–P15 in FIG. 5 for exemplary purposes only, or alternatively, the ripple counter 540 may have a single output (not shown). The plurality of outputs of the ripple counter 540 each represent a different division ratio or number of clock pulses which must elapse before the output changes state.

For example, according to the output chosen from the ripple counter 540, which is represented as pin P12, a predetermined number of clock pulses, in this case 256 pulses, must be received before the output changes state. In other words, after 256 pulses, the output from pin P12 will change either from high to low or low to high.

Additionally, the output chosen from the ripple counter 540 could also be selected to come from any one of the shown pins P1–P9 and P12–P15, such as, for example, pin P5, which, for example, could represent a count of 32 pulses. In other words, after every 32 pulses, the output from pin P5 will change either from high to low or low to high. However, it should be noted that the smaller the number of pulses needed to change the output, the shorter the amount of time there is to store energy in the capacitor 565.

When the low to high change occurs at pin P12, a transistor 580 is temporarily turned on, allowing the charge stored in capacitor 565 to be discharged through one half of the primary winding 571–573 of the transformer 570. The transformer 570 illustrated in FIG. 5 is a step-up transformer that was originally designed to be used as a 110 VAC step-down transformer with a 6 Volt center-tapped secondary winding. However, it should be noted that any number of suitable known or subsequently developed transformers will suffice. In this case, the secondary winding 574–575 operates as the primary winding and the pulse derived from the charge on the capacitor 565 produces a brief pulse of voltage, such as, for example 110 Volts, with a short duration, such as, for example, 1 millisecond, across outputs 590 and 591 to grids 411 and 412 respectively of the display 400.

The pulse steering bridge formed by diodes 576–579 allows the short pulse to charge the capacitor 592 longer than the original pulse because the only leakage path is through the reverse-biased diode 577 and the display 400 itself.

In order to enhance the operation of the display 400, another transistor 583 is pulsed simultaneously with transistor 580 to remove any charge remaining on the capacitor 593. The potential difference between outputs 590 and 591 in the case is approximately 100 Volts, with the output 590 being more positive than the output 591 for a duration sufficient to address the display 400. The output 590 being more positive than the output 591 will hereinafter be referred to as a positive addressing pulse. Correspondingly, a negative addressing pulse results when the output 591 is more positive than the output 590. Each time the display 400 is addressed by either the positive or negative addressing pulse, the depicted image changes.

When the high to low change occurs at the pin P12, the output signal from the inverter 581 switches from low to high, and the reverse pulse is applied to the primary widing 571–573 of the transformer 570 through the switching of the transistor 585. Another transistor 587 is also temporarily turned on at this point and the opposite polarity is made available at output 590 and 591. Again, the potential difference between outputs 590 and 591 is approximately 110 Volts; however; the output 591 is now more positive than the output 590 for a duration sufficient to address the display 400, resulting in a negative addressing pulse being applied to the display 400.

Thus, the controller C periodically switches the potential between outputs 590 and 591 from 110 volts to −110 volts, for example, at a rate determined by the oscillator 530 frequency and the predetermined division ratio output from one of the pins P1–P9 and P12–P15 which has been chosen from the ripple counter 540. Accordingly, the rate at which the image is switched on the display 400 can be arbitrarily chosen so as to periodically switch the display 400 by ambient energy, such as, for example, office lighting.

For example, the particles 424 in the display 400 shown in FIG. 4 have a polarity similar to the particles 24 shown in FIG. 3. In other words, the light absorptive halves 24a of the particles 424 are positively charged and the light reflective halves are negatively charged. When a negative addressing pulse is applied to the region of the display 400 having the second conductors 412", the light absorptive positively charges halves of the particles 424 are attracted to the more negative grid 411 and the particles 424 within the electric field developed by the energized conductors 412", 411 will orate, but without substantial translation, such that the light absorptive halves are oriented toward I.

Furthermore, if a positive addressing pulse is simultaneously applied to the region of the display having the first conductors 412', the light reflective or negatively charged halves of the particles 424 are attracted to the more positive grid 411 and the particles 424 within the electric field developed by the energized conductors 412' therein will also rotate such that the light reflective halves are oriented toward I. Thus, as previously discussed, a dark image can be provided on a light background or vice versa.

It is understood that the polarities of the above discussed pulses that are applied to the conductors 412' and 412", respectively can be reversed to provide a light image on a dark background. It should also be understood that the polarities of the applied pulses can be manipulated such that either the background or the image remains the same shade while the other switches. Thus, resulting in the appearance of a light image on a dark background switching to all dark image and switching back to a light image on a dark background.

Figure 6:
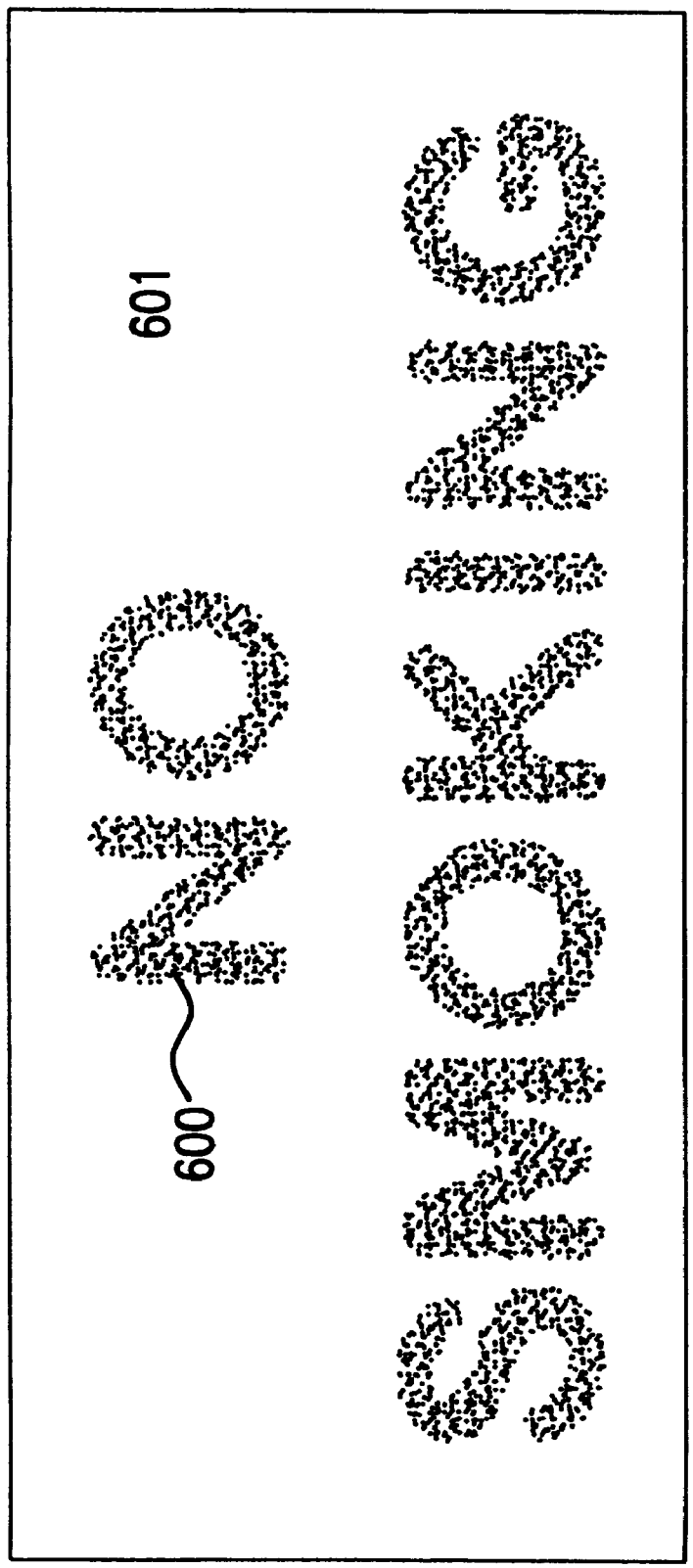
FIG. 6 is an exemplary display.

Consequently, if the electric field developed by the conductors 412" on the grid 412 and the first grid 411 is in a form of a predetermined pattern, such as, for example, one that spells 'NO SMOKING', and a negative addressing pulse is applied to the region of the display 400 covered by the conductors 412" while a positive addressing pulse is applied to the conductors 412' forming a background of the display 400, then a dark image 600 on a light background 601, as illustrated in FIG. 6, would be viewable at I (FIG. 4). In addition, as explained above, if the polarity of the addressing pulses are reversed, the resulting image depicted in FIG. 6 would be light image depicting the text 'NO SMOKING' on a dark background (not shown).

Additionally, the display is bistable. In other words, if the ambient energy receiver 420 and controller C are disconnected from the display 400 or if the ambient energy AE is insufficient, e.g., the lights are turned off, the particles 424 will remain or "sit" in their existing position and not rotate or translate an appreciable amount that would result in the image being altered. As such, the image will stop switching or changing its color or shade, but would not fade.

Thus, in view of the discussion above, an ambient energy powered bistable display is provided that stands alone and does not require an external power source to switch the display. Such a display can have a multitude of practical applications.

For example, it is envisioned that the display according to the invention be used for visible or invisible light powered warning signs, such as the display illustrated in FIG. 6 to alert diners in a cafeteria that smoking is prohibited. In another example of the display according to the invention, it is envisioned that the display is wrapped around power lines. As such, if the power lines are active, an electric field is applied to the display, which shows an image that reads, for example, ON or DANGER. Consequently, when a repairman is called to service a line, the repairman can visually determine if the line is active and take the necessary precautions. In yet another example of an envisioned application of the display according to the invention, a display can be placed on a power transformer with the ambient energy receiver gathering ambient energy in the form of a magnetic field and show a warning image similar to the power line example discussed above. Other examples are serially addressed free-power scoreboards, on-package advertising, railroad station or airport gate destination signs, a clock or a thermometer, as well as a host of other such suitable applications. As such, the above discussed examples are not intended in any way to limit the scope of the present application, but are merely presented to illustrate the broad-based applications of the display according to the invention.

FIGS. 7–10 illustrate schematics of another embodiment of the invention having a controller C that does not have a transformer. Looking at FIG. 7, it can be seen that the controller C in this embodiment includes a logic portion 710 and a display driver portion 750. The logic portion 710 and the display driver portion 750 are separated by a reference line 700 for explanatory purposes and are not limited to the depicted arrangement. It should also be noted that the controller C produces a constant high voltage and does not consume a great deal of the power. In addition, the controller C of this embodiment uses low-dissipation driver circuits for addressing the electrodes of grid 411 and electrodes 412', 412" of the grid 412 in the display 400 to be used in conjunction with the controller C. The driver circuits are discussed in further detail below.

Figure 7:
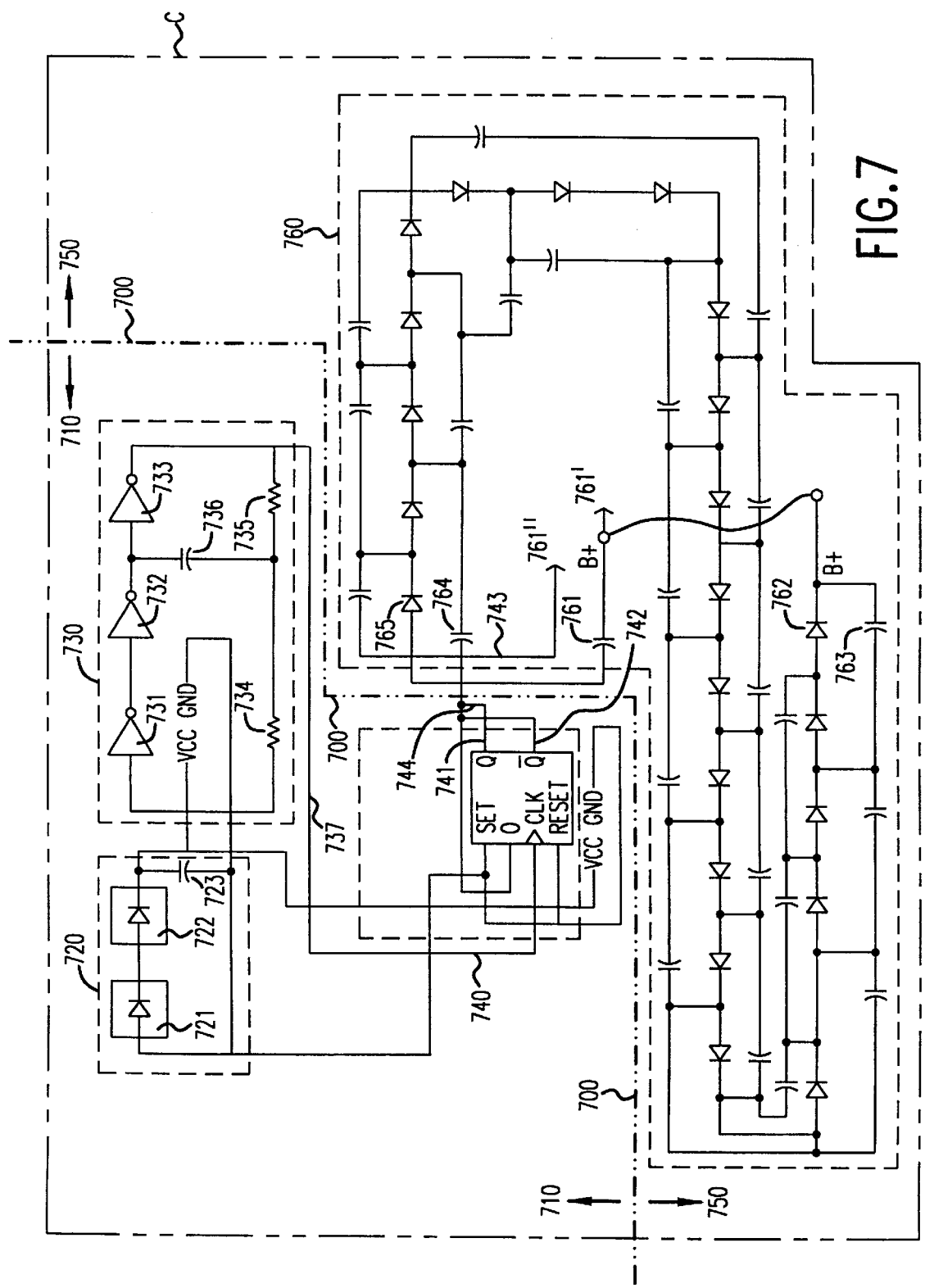
FIG. 7 illustrates a schematic of a second controller according to the invention not having a transformer.

Turning to FIG. 7, it can be seen that the logic portion 710 includes a self-staring oscillator 730 and a toggle flip-flop clocked device 740. The display driver portion 750 includes a voltage multiplier 760 connected as will be described below to one of the drive circuits 800 or 900 illustrated in FIGS. 8 and 9, respectively.

In this embodiment, an ambient energy receiver 720 according to the invention includes ambient energy collectors 721 and 722 connected in series and a capacitor 723 identical to that of the receiver 520 shown in FIG. 5. Incidentally, the ambient energy receiver 720 is identical to the ambient energy receiver 520 discussed above with all of the same capabilities therein. As such, the receiver 720 receives ambient energy and converts the ambient energy into electrical energy sufficient to operate the oscillator 730. Accordingly, the receiver 720 supplies a voltage and current to the oscillator 730 after converting the ambient energy AE received by the collectors 721 and 722 into electrical energy.

The oscillator 730 includes logical inverters 731–733 coupled with resistors 734 and 735 and capacitor 736. The inverters 731–733 may be selected from any number of commercially available 4000-series complementary metallic oxide semiconductor (CMOS) integrated circuits or any other such suitable logic. The oscillator 730 generates a substantially square wave signal on line 737 which is used as an input to the toggle flip-flop 740.

The resulting output signals on lines 743 and 744 from the toggle flip-flop 740 are two substantially square pulse trains from outputs 741 and 742, respectively. The signals on lines 743 and 744 are out of phase with each other. Accordingly, if each of the signals on lines 743 and 744 comprises a signal of 5 Volts peak-to-peak, for example, then the difference between two signals on lines 743 and 744 is a signal that is 10 Volts peak-to-peak. The two signals on lines 743 and 744 are provided to the input of the voltage multiplier 760 which is well known in the art.

The voltage multiplier 760 is formed by a series of diodes and capacitors. The voltage multiplier 760, in light of the exemplary voltage carried by the signals on lines 743 and 744 discussed above, will produce approximately 110 Volts DC across a capacitor 761. The signal is substantially constant and, hence, cannot be used directly for operating a display 400 as in the controller C shown in FIG. 5.

The signal so derived is available at the terminals of the capacitor 761. The positive terminal 761' is at the junction of a diode 762 and the capacitors 761 and 763 is to be used in conjunction with the negative terminal 762" which is at the junction of capacitors 761 and 764, the diode 765 and the signal output from the toggle flip-flop 740 at output 742. This negative terminal is not the same as the common or ground terminal of the ambient energy supply from which it is derived. Any logic electronics connected to any one of the output driver circuits 800, 900, and 1000 must take this feature into account.

As the transformerless design of the controller C for high voltage power provides an exceedingly small amount of current, driver circuits are needed which consume a correspondingly low current, but are able to provide the voltage necessary to provide the electric field to the display 400. A class of high voltage output or driver circuits which are capable of driving substantially capacitive loads with essentially zero static power dissipation have been developed and will be described below. The driver circuits require high voltage transistors of only one polarity. Thus, the driver circuits can be implemented in a technology for which only n-channel high voltage field-effect transistors (FETs) are available.

Figure 9:
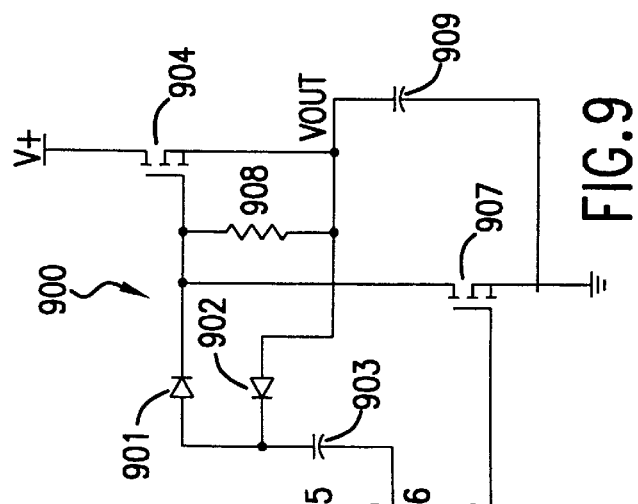
FIG. 9 illustrates a second driver circuit for use with the second controller illustrated in FIG. 7.
Figure 8:
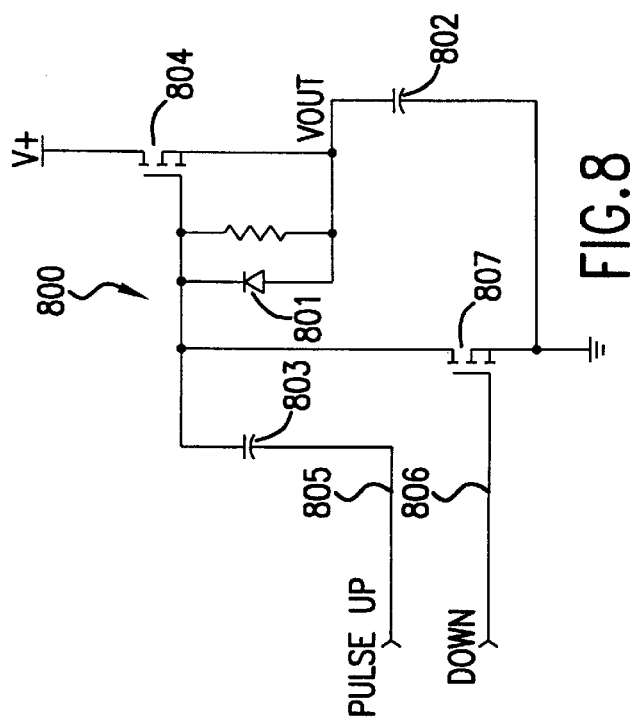
FIG. 8 illustrates a first driver circuit for use with the second controller illustrated in FIG. 7.

FIGS. 8 and 9 are representative of driver circuits in the form of active charge pumps which can operate from a high voltage supply while consuming very little current. As will be shown, with some modifications, both driver circuits can be adapted for use with the controller C of FIG. 7. For example, looking at FIG. 8, a driver circuit 800 is illustrated having a single diode 801. The object of the driver circuit 800 is to charge a load capacitor 802 to a high voltage, represented by the reference character $V^+$ such as, for example 100 Volts or higher, and to subsequently discharge the load capacitor 802 in response to signals from logic circuits (not shown). As illustrated in FIG. 8, a capacitor 803 is used as a charge pump capacitor in conjunction with the diode 801 and a transistor 804. A pulse train signal on line 805 from the logic circuit (not shown) applies a voltage, such as, for example, between 0 and 5 Volts, to one terminal of the charge pump capacitor 803 resulting in the pulse train having am amplitude of approximately 5 Volts, peak-to-peak.

Since the load capacitor 802 prevents any instantaneous change in the voltage at the source, the gate of the transistor 804 is momentarily raised with respect to its source with each low-to-high change of the voltage of the pulse train signal on line 805. When the gate-to-source voltage exceeds the threshold voltage $V^{th}$ of the transistor 804, the transistor 804 turns on and delivers a charge to the load capacitor 802. The output voltage $V^{out}$ then rises until the gate-to-source voltage drops below threshold voltage $V^{th}$, and the transistor 804 turns off. At this point, the output voltage $V^{out}$ has changed by an incremental amount equal to the difference between the amplitude of the pulse train signal on line 805 and the threshold voltage $V^{th}$.

When the voltage of the pulse train signal on line 805 changes from high-to-low, the charge pump capacitor 803 is charged by the load capacitor 802 since the diode 801 becomes forward biased momentarily. In this manner, the voltage on the charge pump capacitor 803 is increased with each alternate half cycle. With each repetition of the cycle, the output voltage $V^{out}$ is increased an incremental amount equal to the difference between the amplitude of the pulse signal on line 805 and the threshold voltage $V^{th}$. If the high voltage $V^+$ is 100 Volts and the maximum voltage of the pulse train signal on line 805 is 5 Volts and the threshold voltage $V^{th}$ is 2.5 volts, then approximately 40 pulses are necessary to raise the output voltage $V^{out}$ to its maximum value. If fewer pulses are used, the result is correspondingly lower output voltage. A single high pulse signal of line 806 from any logic circuit gate, buffer or even an inverter (not shown) will turn on the transistor 807 and discharge both capacitors 802 and 803 where the capacitor 802 is discharged through the diode 801. The configuration of the driver circuit 800 prevents the transistor 804 from inadvertently turning on during the high to low change of the output voltage $V^{out}$ that would occur if the drain of the transistor 807 were connected directly to the source of the transistor 804.

FIG. 9 illustrates an alternative to the one-diode configuration of the driver circuit 800 illustrated in FIG. 8. The driver circuit 900 has two diodes 901 and 902 in place of the single diode 801, thereby providing a faster rise time. The diode 901 acts to suppress leakage of the gate capacitance of the transistor 904, so with the first rising edge of the pulse train signal on line 905, the transistor 904 turns on and does not turn off until either the load capacitor 909 is completely charged or leakage through the resistor 908 or the diode 901 has caused the gate capacitance to discharge below the threshold voltage $V^{th}$ of the transistor 904. Also, the charge pump capacitor 903 is charged through the diode 902 as the load capacitor 909 is charged. As a result, only one or possible two input pulses, as opposed to 40, as is needed for the driver circuit 800 discussed above, are needed to switch the output voltage $V^{out}$, depending on the leakage current, of course, The transistor 907 operates similarly to the transistor 807 such that the load capacitor 909 can be discharged without simultaneously turning on the transistor 904.

During the quiescent state, both driving circuits 800 and 900 consume essentially zero leakage current. Level shifting to drive the transistors 804 and 904, respectively, is accomplished through the charge pump capacitors 803 and 903, respectively, and the level shifting voltage is derived directly from the output voltage $V^{out}$ for each circuit 800 and 900. As such, both transistors 804 and 807 and 904 and 907 for each circuit 800 and 900, respectively, are turned off in this state so that only their leakage current is drawn from the high voltage supply.

When used in conjunction with the transformerless power supply illustrated in FIG. 7, the driver circuits 800 and 900 shown in FIGS. 8 and 9 can be used with the controller C in FIG. 7 by making some modifications as will be discussed below. The common voltage for the logic circuitry is taken from the minus terminal of the ambient energy collector array 720. However, the $B^-$ terminal is actually pulsing at the logic level of voltage with respect to this logic common. Thus, an opportunity arises for whatever logic electronics is created to generate the control pulses for the output drivers. Rather than requiring the presence or absence of pulses to the "Pulse Up" input or the "Down" input, the phase of the pulses relative to $B^-$ terminal can be used to determine the input.

Figure 10:
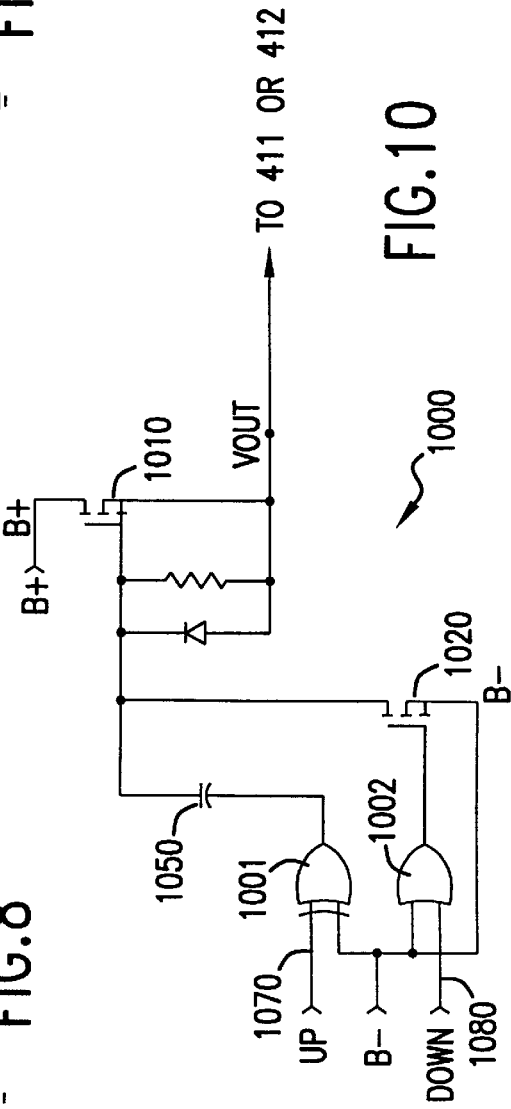
FIG. 10 illustrates a third driver circuit for use with the second controller illustrated in FIG. 7.

FIG. 10 illustrates implementation of such as phase-sensitive logic circuit 1000 with the single-diode output driver circuit illustrated in FIG. 8 to operate the display 400. Looking at FIG. 10, it can be seen that if the output of the OR gate 1002 is pulsing in phase with the $B^-$ terminal, by having a logic low at the DOWN input, then no drive voltage will be applied to the transistor 1020 and the transistor 1020 will remain in the off state. Likewise, if the output of the exclusive-OR gate 1001 is pulsing in phase with the $B^-$ terminal, by having a logic low at the UP input, no charge pumping action will occur with the charge pump capacitor 1050, and the transistor 1010 will remain off. However, should the gate 1001 produce a signal which is out of phase with the $B^-$ terminal, by having a logic high at the UP input, pulses applied to the charge pump capacitor 1050 will cause charge pumping action and the transistor 1010 will be turned on by the mechanisms outlined above. This will bring $V^{out}$ to up the $B^{30}$. Likewise, if the DOWN input of the gate 1002 is held high, the transistor 1020 will receive a sequence of pulses which will repeatedly turn it on bringing $V^{out}$ down to $B^-$. The $V^{out}$ of the phase sensitive logic circuit 1000 is output directed to either grid 411 or grid 412. In this manner, low power CMOS circuitry operating from the power provided directly from the ambient energy collectors 720 can be used to drive the high voltage outputs. It will be understood that this feature also applies to the dual-diode configuration of driver circuit 900 illustrated in FIG. 9

Figure 11:
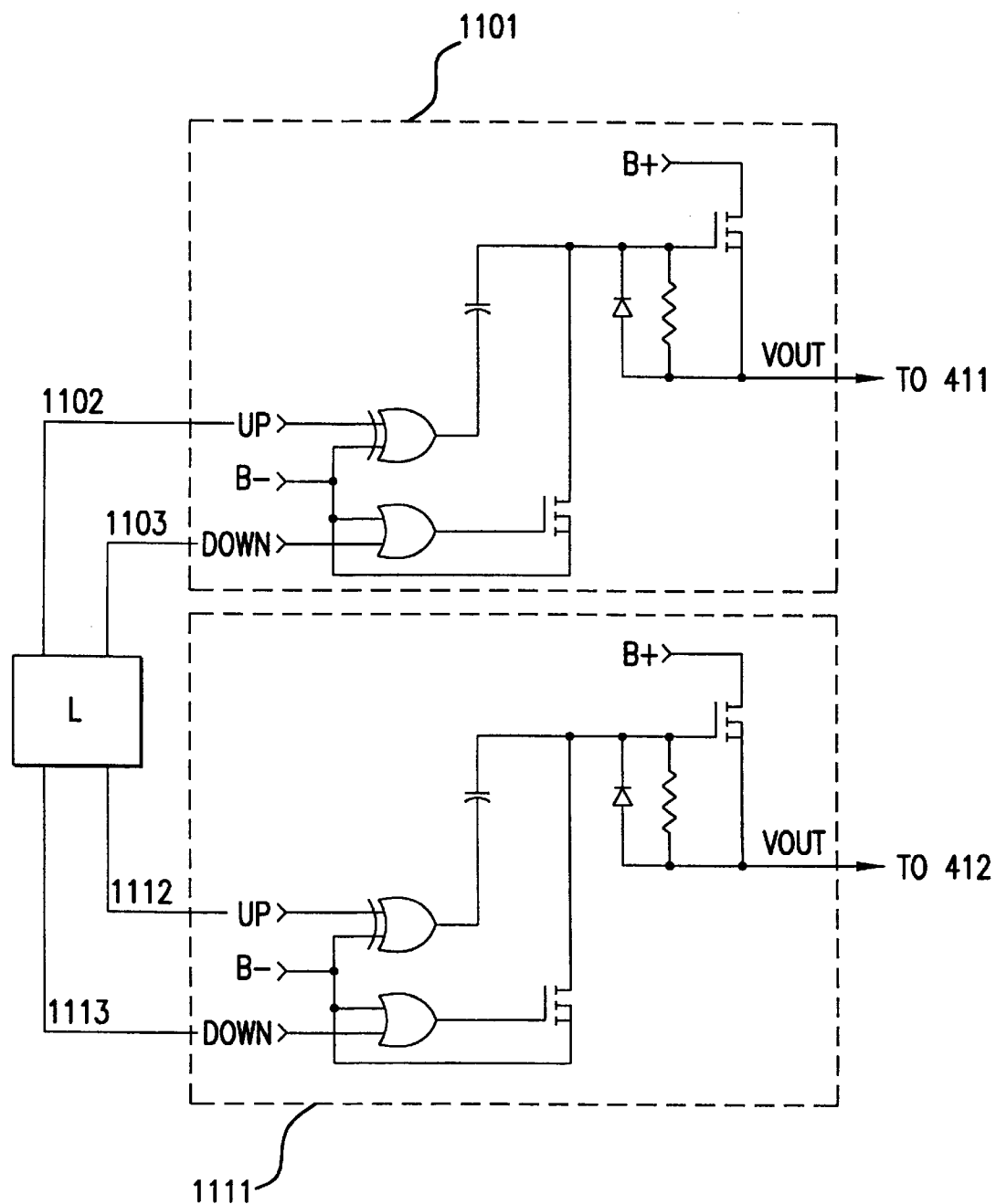
FIG. 11 illustrates a series of the circuits illustrated in FIG. 10.

FIG. 11 illustrates a series of phase-sensitive logic circuits. Logic L is designed to provide a logical high signal on line 1102 of driver circuit 1101 to cause grid 411 to rise to the voltage B⁺, while also sending a logical high signal to driver circuit 1111 on line 1113 to cause grid 412 to drop to the voltage of B⁻. This results in a positive voltage difference between grids 411 and 412. At some time later, logic L sets line 1102 low and line 1103 high, while setting line 1113 low and line 1112 high. This results in the voltage at grid 412 rising to B⁺ while the voltage at grid 411 falls to B'. At this point, a negative potential difference is established between grids 411 and 412. This sequence can be repeated according to the desired image for the display element connected to the conductors within the grids 411 and 412.

it should be noted that the above described embodiments of the invention are also bistable. In other words, if the controller C and ambient light receiver 720 are disconnected from the display 400, the particles 424 will remain or "sit" in their existing disposition and not rotate or translate an appreciable amount that would result in the image being altered. As such, the image will stop switching or changing its color or shade, but will not fade.

Figure 12:
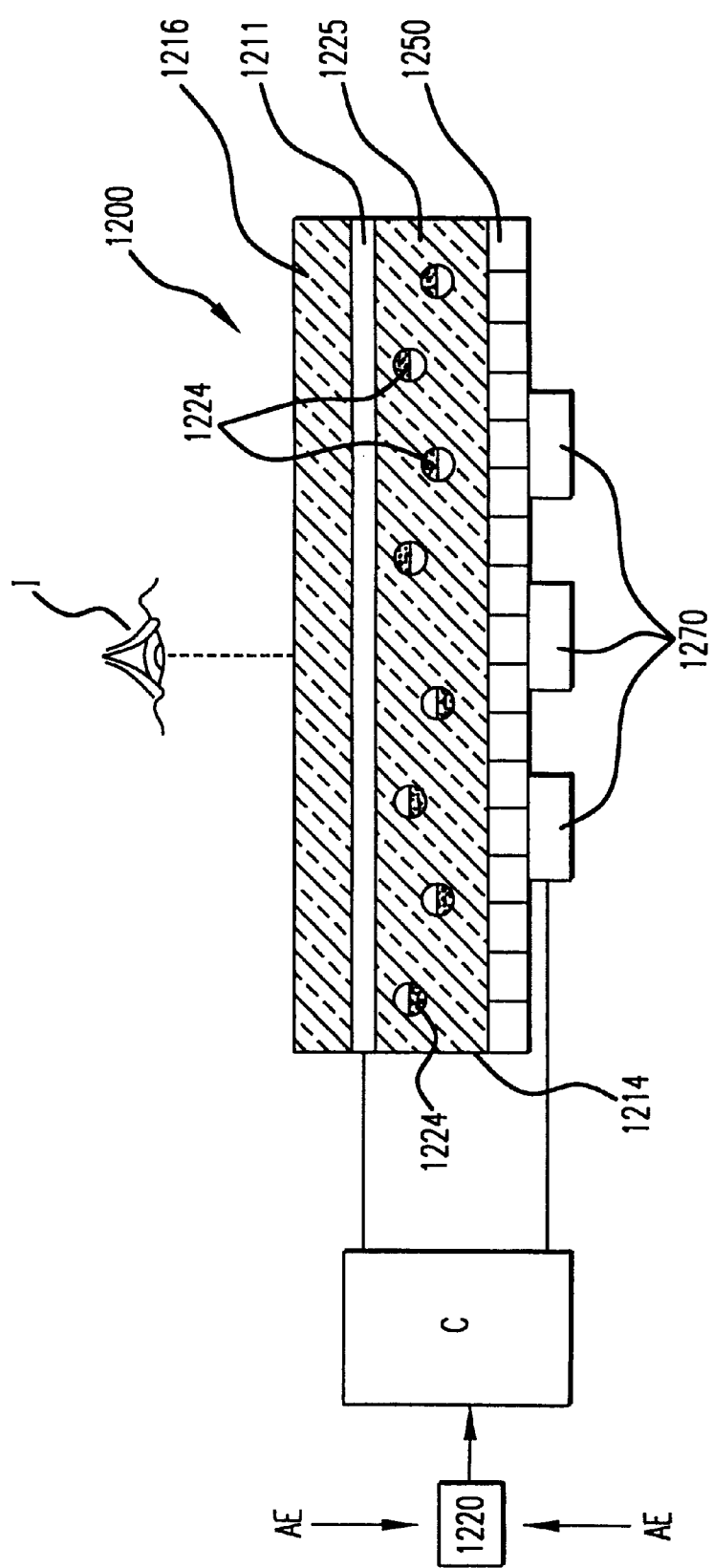
FIG. 12 illustrates a second embodiment of the display according to the invention.

FIG. 12 illustrates yet another embodiment of the display according to the invention. The display 1200 is similar to the display 400 shown in FIG. 4. However, the grid 412, conductors 412' and 412" and substrate 418 are replaced by a thin plastic layer 1250 and fixed addressing pattern electrodes 1270. The remaining elements of the display 1200 are identical to the elements of the elements of the display 400 and will not be discussed in great detail herein. It should be noted that although the display 1200 is illustrated as having an ambient energy receiver 1220 providing an operating signal to the controller C, a power source (not shown), such as, for example, batteries, hardwire electrical connections or other known or subsequently developed power source, could be used to operate this embodiment of the invention.

The fixed addressing pattern electrodes 1270 are user configurable and are designed to allow a user the ability to make the display 1200 in the field, e.g., at or near a site where the display is to be deployed immediately or shortly after it is configured. For example, the electrodes 1270 can be copper foil labels, such as the copper foil tape with adhesive backing manufactured and sold by Minnesota Mining and Manufacturing Company, or labels of any other known or subsequently developed conductive material, that are peeled off a supply. The electrodes 1270 are applied to the plastic layer 1250, which is therein enough so that the plastic layer 1250 has a capacitance high enough so that the electric field from the electrodes 1270, as applied by switching voltages from the controller C, which are connected to the electrodes 1270 and the grid 1211, will pass through the plastic layer 1250 to the display panel 1214. As a result, a switching version of the desired pattern is viewable at I.

For example, a user can select copper peel-of portions for the electrodes 1270 portions to form words or images of a sign, such as, for example, to spell out the words NO SMOKING as illustrated in FIG. 6. The selected letters are applied to the thin plastic sheet 1250 by an adhesive or other such known or subsequently developed adhesion method. In this example and as previously discussed, the substrate 1216 and grid 1211 should be optically transparent. Depending upon the polarity of the applied switching voltages, which are discussed above, the resulting display 1200 can have a constant background color and a worded or symbolic message that alternates between the background with white foreground would alternate to an all black display. Alternatively, the background can be made to switch by construction of suitable electrodes and connection to suitable drive electronics as described above.

In yet another embodiment of the display 1200 according to the invention, a printer capable of printing conductive patterns using a conductive fluid produces a desired pattern on a substrate to be attached to the plastics sheet 1250 of the display 1200 or prints the pattern directly onto the plastic sheet 1250. As such, it is envisioned that the a road crew worker would be able to create a sign that would be placed on the side of the road to arm motorists of an accident further down the road and advising them to plan their route accordingly. An electrode can be fixed within the display to which the foil letters are connected by conductive lines to provides the electric field across the portions of the display covered by the letters.

Another embodiment of the display according to the invention, but not shown herein, is to have a hand-held implement, similar to a pen, that has conductive ink or other fluid that the user applies to the plastic sheet 1250 in a desired pattern, e.g., the user could write a message on the plastic sheet or display. It will be apparent that the practical applications for such as portable, field configurable display are numerous.

Figure 13:
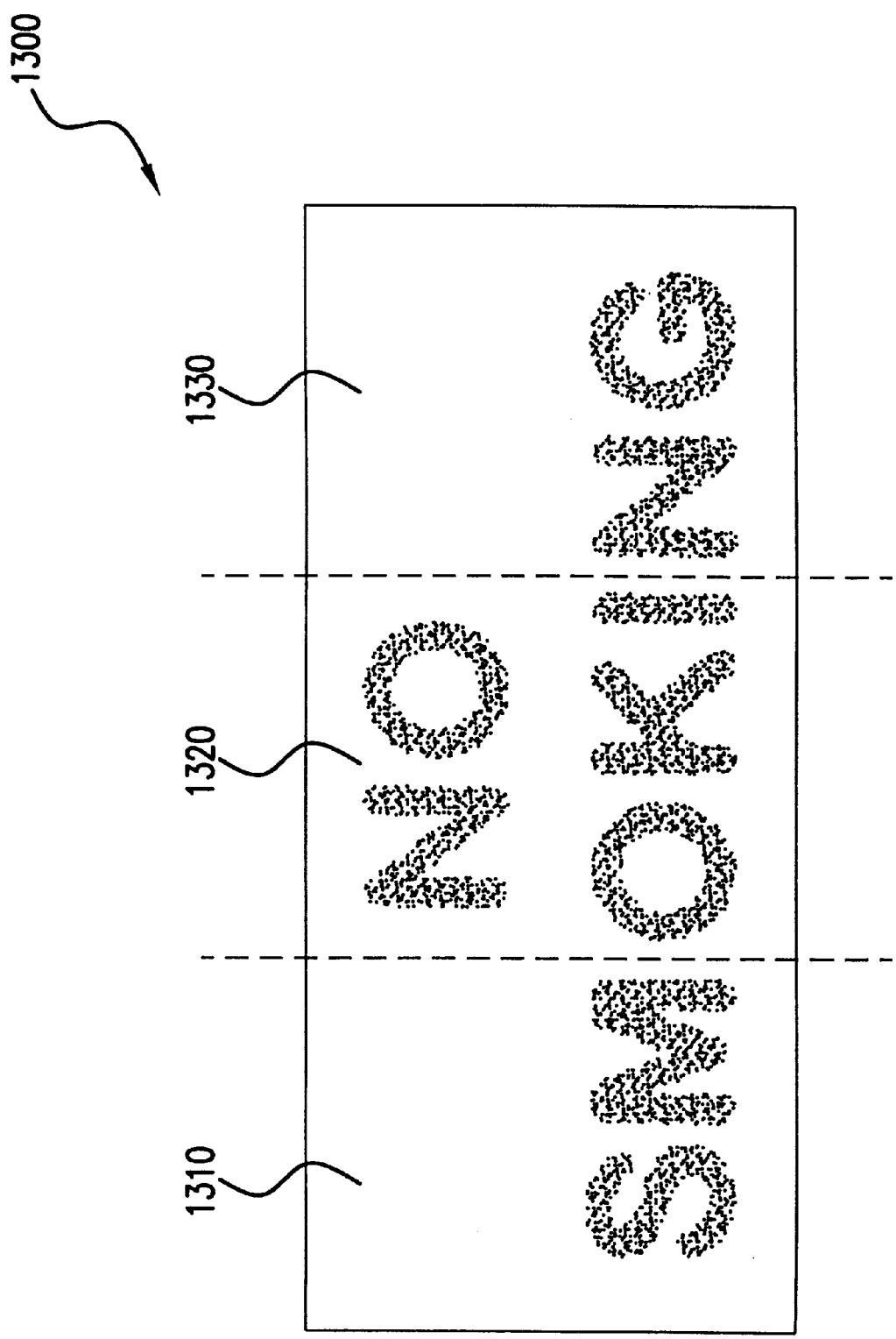
FIG. 13 illustrates an example display formed by the second embodiment of the display of FIG. 12.

A multi-colored display could be constructed by using, for example, adjoining display panels having different colored particles therein. For example, looking at FIG. 13, the display 1300 could be constructed of a plurality of adjoining panels 1310, 1320, and 1330, such as, for example, three. In this case, the display panel 1310 would contain patterned electrical conductors that form the letters SM. Furthermore, the particles within the display panel 1310 could have one half being red and the other yellow. The display panel 1320 would contain patterned electrical conductors that form the letters NO and OKI. Additionally, the particles within the display panel 1320 could have one half black and the other half white. The display panel 1330 would contain patterned electrical conductors that are connected and form the letters NG. Also, the particles within the display panel 1330 could have one half blue and the other gray. As such, depending on the polarity of the halves of each of the particles, which would be dependent upon their Zeta potential, and the application of switching positive and negative addressing pulses, the letters SM and their respective background would switch colors between red and yellow, the letters NO and OKI and their respective background would switch colors between black and white, and the letters NG and theirs respective background would switch colors between blue and gray.

In addition, the applied letters or symbols can be connected together, by, for example, conductive tape or conductive fluid from a hand-held pen, so as to form a single electrode, or could just as easily be separately powered by separate leads. In addition, it is possible to create a display in the field that would flash the letters or symbols synchronously so all the displays depending on the timing of the switching addressing pulses to predetermined panels 1310, 1320, and 1330 of the display 1300.

In yet another embodiment of the display according to the invention and as disclosed in pending U.S. Pat. application Ser. No 08/960,865 entitled "TWISTING-CYLINDER DISPLAY" filed Oct. 30, 1997, which is incorporated by reference hereinabove, the display can have cylindrical, rather than spherical rotating particles. The particles can be bichromal or polychromal cylinders, aligned parallel to one another and packed close together in a monolayer. Such a configuration would provide excellent brightness characteristics as well as relative ease of manufacture.

Figure 14:
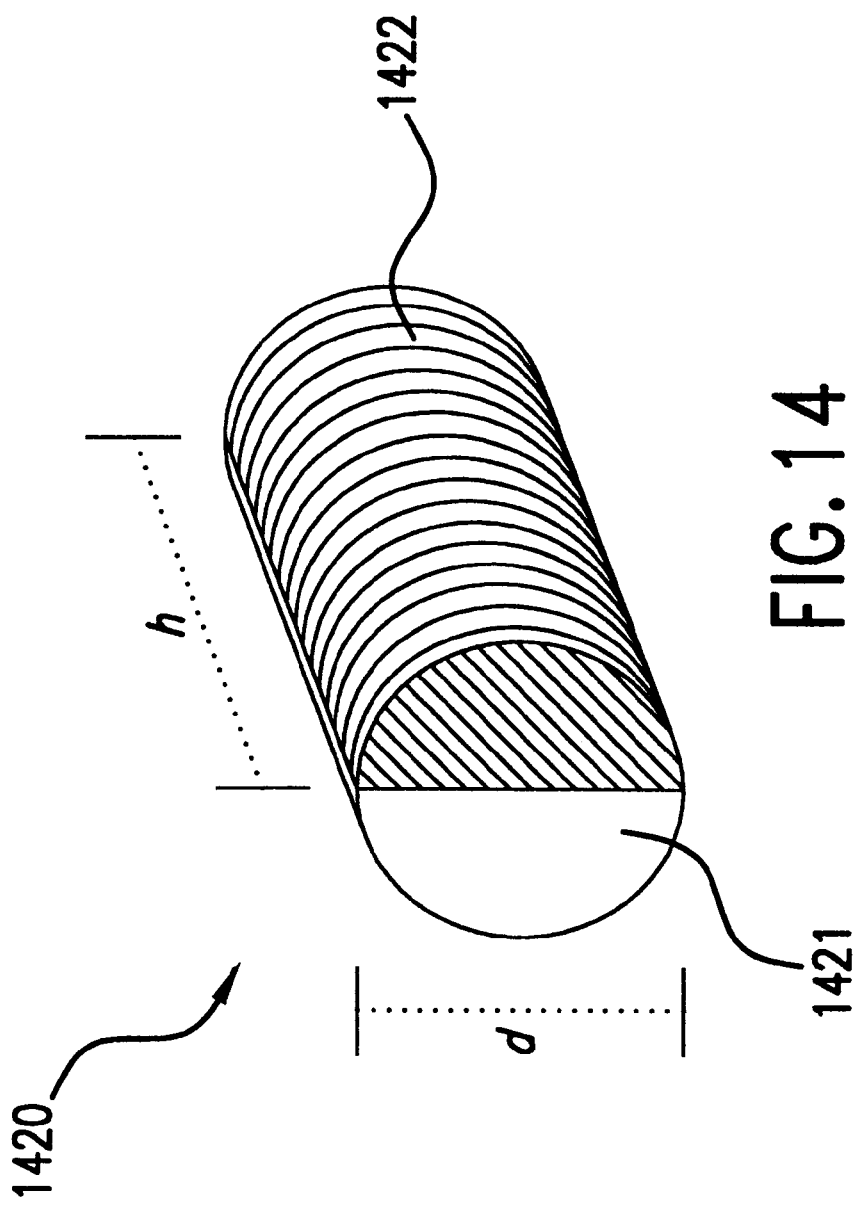
FIG. 14 illustrates a bichromal rotating particle of a third embodiment of the display according to the invention.

For example, FIG. 14 illustrates a bichromal cylinder 1420 suitable for use as a rotating particle of the inventive display. Cylinder 1420 has a white face 1421 and a black face 1422. Cylinder 1420 is of height (or length) h and has a diameter d. In the presence of a dielectric fluid, the cylinder 1420 is electrically dipolar.

Figure 15:
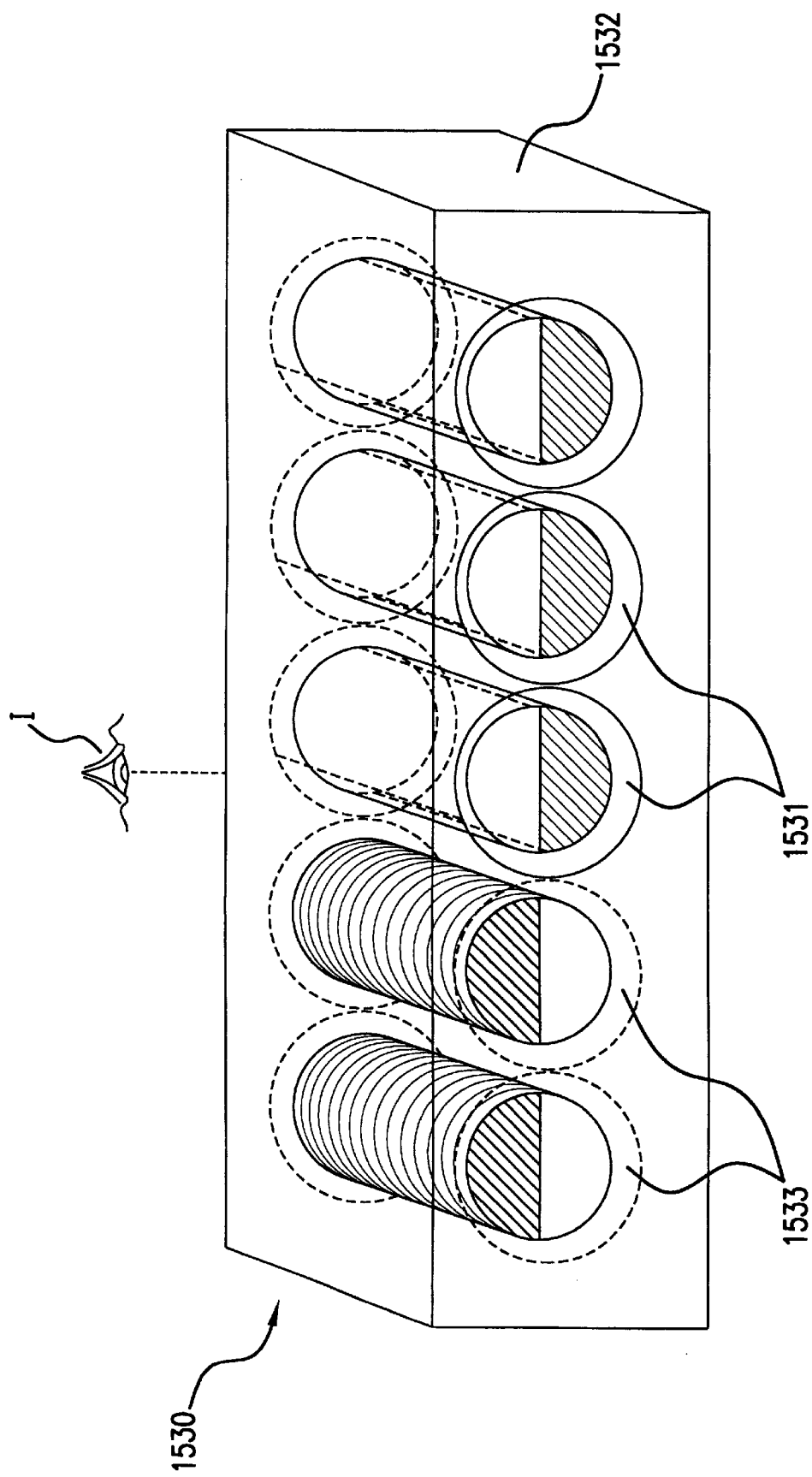
FIG. 15 illustrates an arrangement of the bichromal particle of FIG. 14.

FIG. 15 illustrates how the bichromal cylinders can be arranged in an elastomer substrate of a display 1530. In the display 1530, the bichromal cylinders 1531 are disposed in an elastomer substrate 1532 that is swelled by a dielectric fluid in the cavities 1533 in which the cylinders 1531 are free to rotate about their respective longitudinal axes. Cavities 1533 are not much longer in diameter than cylinder 1531, so that cylinders 1531 are constrained from rotating about their medial axes. Cylinders 1531 are electrically dipolar in the presence of the dielectric fluid, and so are subject to rotation upon application of an electric field. As shown, cylinders 1531 can be rotated so as to expose either their white or black faces to an observer at I.

In yet another embodiment of the display according to the invention and as disclosed in pending U.S. Pat. application Ser. No. 08960,868 entitled "A TWISTING CYLINDER DISPLAY USING MULTIPLE CHROMATIC VALUES" filed on Oct. 30, 1997, which is incorporated by reference hereinabove, the display can have rotating cylindrical particles multiple chromatic values.

FIG. 15 illustrates a cylindrical rotating particle 1621 having a circumference surface 1622 composed of a clear material to allow viewing of a plurality of display surfaces 1621a, 1621b, 1621c which are classified by different optical properties and are arranged in a circumference direction around a longitudinal axis LA. For example, in a display using a gray scale display surface 1621 would be black while display surface 1621b would be white and display surface 1621c would be some intermediate value between black and white. In a display using highlight color display surface 1621a would be black while display surface 1621b would be white and display surface 1621c would be any color, such as red or green, chosen by the manufacturer of the display. In a display using full color display surface 1621a would be red while display surface 1621b would be green and display surface 1621c would be blue.

Figure 17:
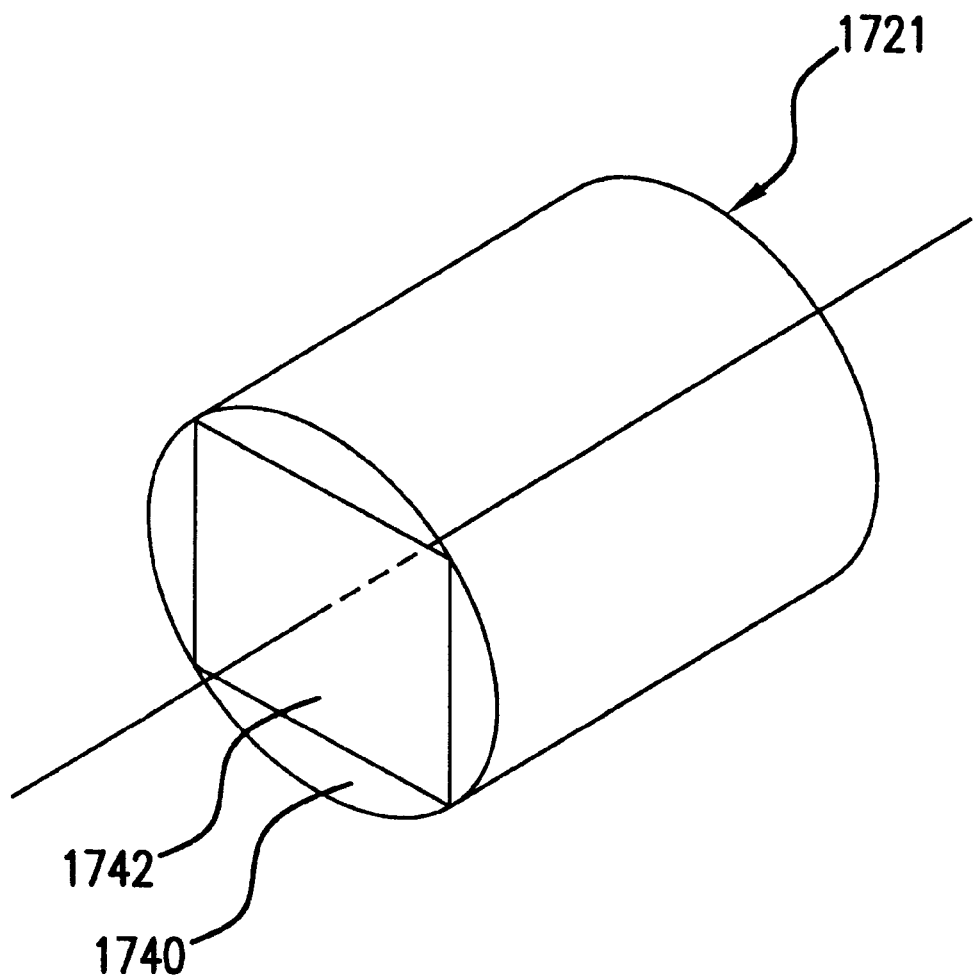
FIG. 17 illustrates a cylindrical rotating particle having a multisided display surface.

As can be seen in FIG. 17, cylindrical rotating particle 1721 is constructed of a multsided display surface 1742, in this example a square column shaped surface, encased within a clear cylinder 1740.

Figure 16:
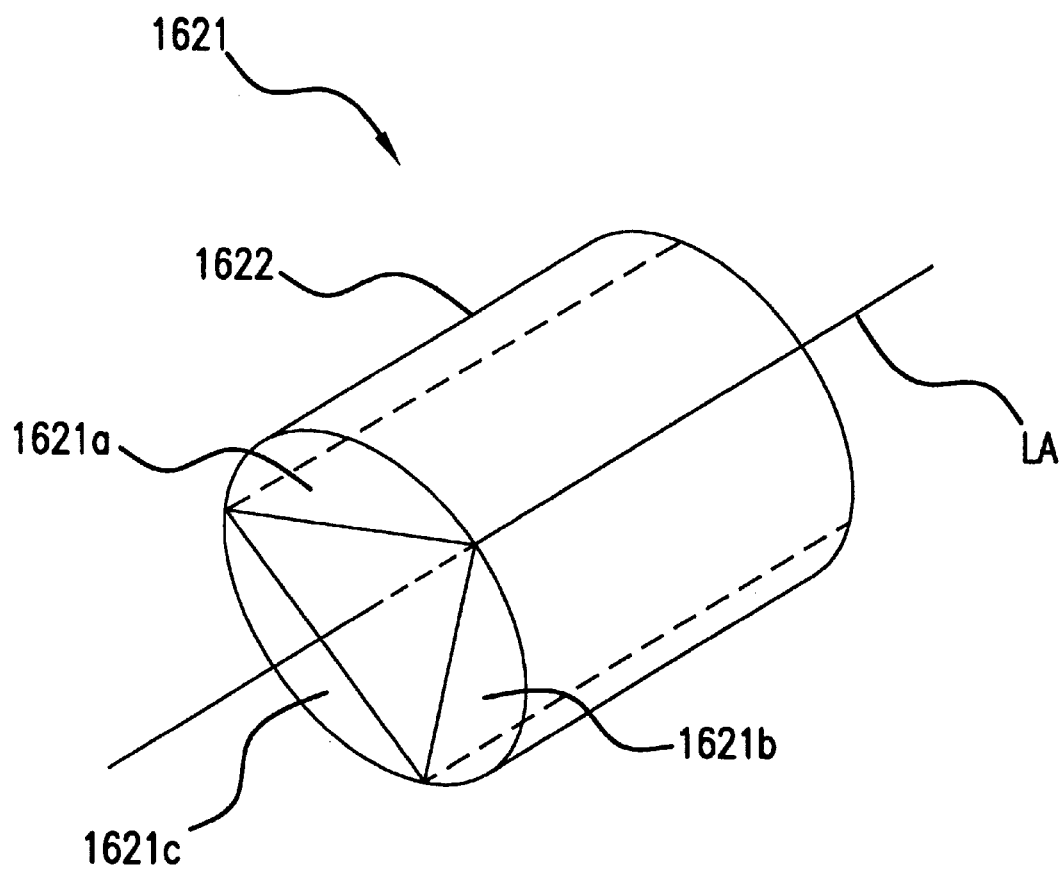
FIG. 16 illustrates a rotating cylindrical particle having multiple chromatic values.

Both FIGS. 16 and 17 illustrate two similar embodiments of the rotating particle 1621 and 1721 with specific examples of what each display surface contains. However, the multisided display need not be limited to three or four sides and the optical characteristics on the sides are not limited to black, gray, white and selections of colors. Any individual side can have any optical property such as black, white, gray, color, polarization, birefringence, phase retardation, light absorption, light scattering, and light reflection. As such, any rotating particle can include any combination of the above properties.

In yet another embodiment of the display according to the invention and as disclosed in U.S. Pat. No 5,604,027 entitled "SOME USES FOR MICROENCAPSULATION FOR ELECTRIC PAPER" to Sheridon, which is incorporated by reference hereinabove, the display can have rotating particles that use a separate encapsulating shell to enclose both the rotating particles and a sufficient thickness of the dielectric fluid to allow free rotation of the rotating particle.

Figure 18:
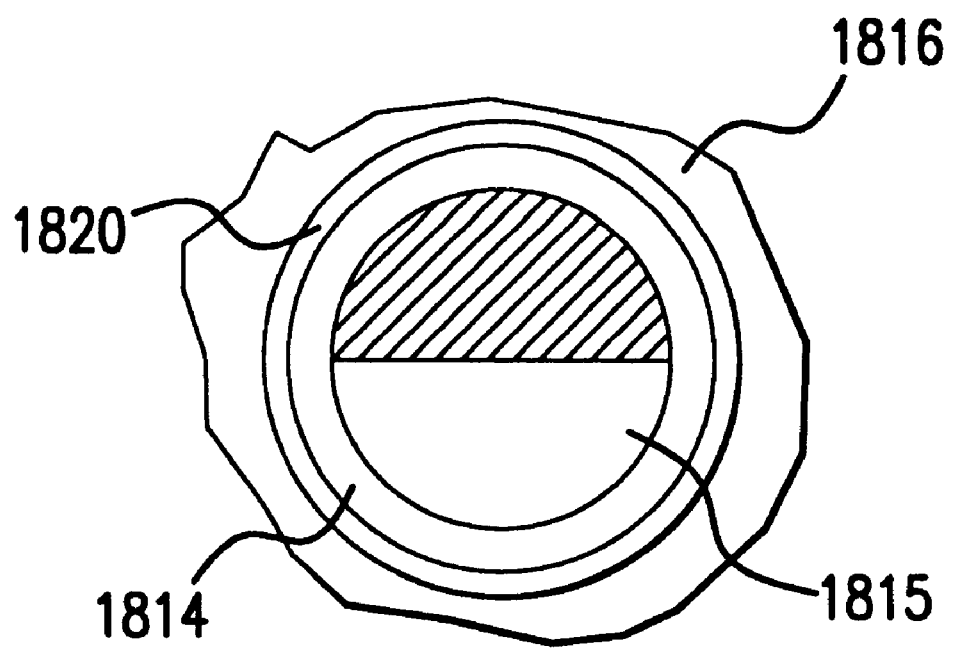
FIG. 18 illustrates a microencapsulated rotating particle.

FIG. 18 shows a rotating particle 1815 surrounded by an oil 1814. A separate encapsulating shell 1820 encloses both the rotating particle 1815 and the oil 1814 to allow for the free rotation of the rotating particle 1815. The rotating particle 1815, the oil 1814 and the encapsulating shell 1820 are encased in a substrate 1816. A wide variety of substrate materials are possible due to the use of encapsulated rotating elements which eliminates the need to swell the substrate 1816 in a elastomer.

To ensure the optimum level of color saturation and overall image quality in a display, a layer of rotating elements should appear as complete to an observer as possible. Several methods are known in the art for obtaining optimum area coverage. For example, the packing methods described in U.S. Pat. application Ser. No. 08/713,935, entitled "MONOLAYER GYRICON DISPLAY"; U.S. Pat. application Ser. No. 08/713,936, entitled "HIGH REFLECTANCE GYRICON DISPLAY"; U.S. Pat. application Ser. No. 08/716,675, entitled "GYRICON DISPLAY WITH INTERSTITIALLY PACKED PARTICLE ARRAYS"; and U.S. Pat. application Ser. No. 08/713,325, entitled "GYRICON DISPLAY WITH NO ELASTOMER SUBSTRATE" and herein incorporated by reference can be applied to the display of this invention.

Any of the packing structures or methods of making the display or other display configurations illustrated in the above-listed applications can be used for the display layers 414 and 1214 shown in FIGS. 4 and 12.

In yet another embodiment of the display according to the invention, the display in any of the above embodiments can be an electrophoretic display device, such as that described in the article entitled "A Stylus Writable Electrophoretic Display Device" authored by A. Chiang, D. Curry and M. Zarzycki and published in SID Digest 79, pp. 44–45, which is incorporated herein by reference.

Further, the display device in any of the above embodiments can be an LCD device, such as that described in U.S. Pat. No. 4,4688,900 Doane et al; U.S. Pat. No. 4,890,902 to Doane et al; and U.S. Pat. No. 5,251,048 to Doane et al.

While the invention has been described in conjunction with specific embodiments thereof, it is evident that many alternatives, modification and variations may be apparent to those skilled in the art. For example, the driver circuitry could be made more sophisticated, to include, for example, a microprocessor now known or later developed of sufficiently low power requirements to control the presented sequence of multiple patterns of a display, such as the multi-word display of FIG. 13. Accordingly, the specific embodiments of the invention as set forth herein are intended to be illustrative, not limiting. Various changes may be made without departing from the spirit and scope of the invention as set forth in the following claims.

What is claimed is:

1. An ambient energy powered display comprising:

a bistable display device;

an ambient energy receiver for collecting ambient energy source;

a logic circuit including an oscillator and a counter; and a display driver circuit including a voltage multiplier and a transformer circuit, wherein the logic circuit receives an operating voltage from the ambient energy receiver and provides a control signal to the display driver circuit, the logic circuit generating the control signal using only energy provided to the logic circuit from the ambient energy source, and the display driver driving the bistable display device using only energy provided from the ambient energy source.

2. The ambient energy powered display according to claim 1 wherein the bitable display device comprises electric paper.

3. The ambient energy powered display according to claim 2 wherein the bitable display device comprises a gyricon display.

4. The ambient energy powered display according to claim 1 further comprising electrodes on opposite side so fth bistable display device for applying an electric field across selected portions of the bistable display device.

5. The ambient energy powered display device according to claim 4 wherein at least one of the electrodes comprises a matrix.

6. The ambient energy powered display device according to claim 4 wherein at least one of the electrodes comprise a continuous conductive layer.

7. The ambient energy powered display device according to claim 4 wherein at least one of the electrodes comprises patterned electrical conductors.

8. The ambient energy powered display according to claim 1 wherein the ambient energy receiver includes at least one ambient energy collector.

9. The ambient energy powered display according to claim 8 wherein the ambient energy collector comprises a solar cell.

10. The ambient energy powered display device according to claim 1 wherein the voltage multiplier is a voltage doubler.

11. The ambient energy powered display device according to claim 1 wherein the oscillator receives the operating voltage from the ambient energy receiver and transmits a clock input signal to the counter and a voltage signal to a voltage doubler, the counter sending a clock pulse signal to the transformer circuit allowing a charge stored capacitor to discharge through a primary winding of a transformer to change a state of an output to the bistable display device.

12. The ambient energy powered display according to claim 1 wherein the logic portion includes an oscillator and a toggle flip-flop and the display driver includes a voltage multiplier and a driver circuit.

13. The ambient energy powered display according to claim 12 wherein the oscillator receives the operating signal from the ambient energy receiver and transmits a signal to the flip-flop, the flip-flop processes the signal and emits a pulse train to the voltage multiplier, the driver circuit switching a charge applied to the bistable display based on a charge signal received from the multiplier.

14. A user configurable bistable display comprising:
a bistable display device;
a power source that generates an operating voltage;
a controller that receives the operating voltage and generates a control signal, wherein the controller comprises a logic portion including an oscillator and a counter and a display driver portion including a voltage multiplier and a transformer; and
user configurable pattern electrodes affixed to a portion of the bistable display, the pattern electrodes receiving the control signal from the controller and applying an electric field across user selected portions of the display device.

15. The bistable display according to claim 14 wherein the bistable display comprises electric paper.

16. The bistable display according to claim 14 wherein the bistable display device comprises a gyricon display.

17. The bistable display according to claim 14 wherein the power source comprises at least one battery.

18. The bistable display according to claim 14 wherein the power source comprises a hardwired electrical connection.

19. The bistable display according to claim 14 wherein the power source comprises an ambient energy receiver, the receiver having at least one ambient energy collector.

20. The bistable display according to claim 19 wherein the ambient energy collector comprises a solar cell.

21. A method of displaying images comprising:
displaying a first image on a bistable display device, the bistable display device including a display driver portion having a voltage multiplier an da transformer circuit, the first image including a first region displayed with a first optical characteristic and a second region displayed with a second optical characteristic which is different than the first optical characteristic;
receiving in the display device a control signal produced by a logic circuit having an oscillator and a counter, the circuit being powered by ambient energy; and
responsively to the control signal, displaying a second image on the bistable display device, the second image including the first and second regions, the first region being displayed in a third optical characteristic other than the first optical characteristic and the second region being displayed in a fourth optical characteristic other than the second optical characteristic.

22. A method of creating a display, the method being suitable for execution proximate to a location where the display is to be deployed, the method comprising:
configuring a set of electrodes in a pattern corresponding to an image to be displayed;
affixing the set of electrodes to a bistable, electrically activatable display device; and
operatively coupling the display device with the electrodes thus affixed to an ambient energy receiver and a controller, the controller being capable of generating a control signal for the display device using energy derived only from the ambient energy source, wherein the controller comprises a logic portion including an oscillator and a counter and a display driver portion including a voltage multiplier and a transformer.

23. The method of claim 22 in which the configuring step comprises taking a piece of electrically conductive material from a supply of such material and shaping the conductive material to a desired shape.

24. A display method comprising:
displaying an image on a bistable display device, the bistable display device including a display driver portion having a voltage multiplier and a transformer circuit, the image including a first optical characteristic, the optical characteristic being viewable to an observer situated favorable to view the display in ambient light;
receiving in the display a control signal produced by a logic circuit powered by ambient light, the logic circuit having an oscillator and a counter; and
responsively to the signal, displaying on the device an image displaying a second optical characteristic.

* * * * *